(12) United States Patent
Lechkun

(10) Patent No.: US 7,441,790 B2
(45) Date of Patent: Oct. 28, 2008

(54) DEPLOYABLE STEP AND BODY-SIDE ASSEMBLY FOR A VEHICLE

(75) Inventor: David M. Lechkun, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 145 days.

(21) Appl. No.: 11/466,829

(22) Filed: Aug. 24, 2006

(65) Prior Publication Data

US 2008/0054586 A1  Mar. 6, 2008

(51) Int. Cl.
B60R 3/02 (2006.01)

(52) U.S. Cl. ........................ 280/166; 280/163

(58) Field of Classification Search ........... 280/166, 280/163, 164.1
See application file for complete search history.

(56) References Cited

U.S. PATENT DOCUMENTS

| | | | |
|---|---|---|---|
| 3,887,217 A | | 6/1975 | Thomas |
| 4,020,920 A | | 5/1977 | Abbott |
| 4,073,502 A | * | 2/1978 | Frank et al. ............ 280/166 |
| 4,116,457 A | | 9/1978 | Nerem et al. |
| 4,180,143 A | * | 12/1979 | Clugston ............... 182/91 |
| 4,188,889 A | | 2/1980 | Favrel |
| 4,623,160 A | | 11/1986 | Trudell |
| 4,982,974 A | | 1/1991 | Guidry |
| 5,085,450 A | * | 2/1992 | DeHart, Sr. ............ 280/166 |
| 5,498,012 A | | 3/1996 | McDaniel et al. |
| 5,538,269 A | | 7/1996 | McDaniel et al. |
| 6,641,158 B2 | * | 11/2003 | Leitner ................. 280/166 |
| 6,830,257 B2 | * | 12/2004 | Leitner ................. 280/166 |
| 6,834,875 B2 | * | 12/2004 | Leitner et al. .......... 280/166 |
| 6,926,295 B2 | | 8/2005 | Berkebile et al. |
| 6,938,909 B2 | * | 9/2005 | Leitner ................. 280/166 |
| 6,942,233 B2 | | 9/2005 | Leitner et al. |
| 6,955,370 B2 | | 10/2005 | Fabiano et al. |
| 6,966,597 B2 | | 11/2005 | Tegtmeier |
| 7,007,961 B2 | * | 3/2006 | Leitner et al. .......... 280/166 |
| 7,055,839 B2 | * | 6/2006 | Leitner ................. 280/166 |
| 7,118,120 B2 | * | 10/2006 | Lee et al. .............. 280/166 |

(Continued)

FOREIGN PATENT DOCUMENTS

EP 0884219 12/1998

*Primary Examiner*—Jeffrey J Restifo
(74) *Attorney, Agent, or Firm*—Dickinson Wright PLLC; Greg Brown; Ray Coppiellie

(57) ABSTRACT

A deployable step and body-side assembly including a step body-side structure, one or more link assemblies, and an actuator. The step body-side structure is attached to the vehicle by the link assemblies. Each link assembly includes a carrier, an extending arm, a first link, a second link, a first rotating arm, and a second rotating arm. The carrier is attached to the step body-side structure and pivotally attached to the extending arm. The extending arm is pivotally attached to the vehicle by the first link and the second link so as to move the step body-side structure in an inboard direction and an outboard direction. The first rotating arm and second rotating arm rotate the step body-side structure, with the carrier pivotally attached to the vehicle by first rotating arm. The second rotating arm is pivotally attached to the first rotating arm, as well as the extending arm, the first link, and/or the second link. The step body-side structure is moved between the stored and deployed positions by an actuator.

18 Claims, 3 Drawing Sheets

U.S. PATENT DOCUMENTS

| | | | |
|---|---|---|---|
| 7,163,221 B2 * | 1/2007 | Leitner | 280/166 |
| 7,287,771 B2 * | 10/2007 | Lee et al. | 280/166 |
| 7,380,807 B2 * | 6/2008 | Leitner | 280/166 |
| 2005/0104318 A1 | 5/2005 | Lee et al. | |
| 2005/0167941 A1 | 8/2005 | Garland et al. | |
| 2005/0179227 A1 | 8/2005 | Leitner | |

* cited by examiner

DEPLOYABLE STEP AND BODY-SIDE ASSEMBLY FOR A VEHICLE

TECHNICAL FIELD

The present invention relates generally to body-side assemblies for vehicles, and more particularly to a deployable step and body-side assembly having substantial rotational motion, as compared with conventional deployable steps.

BACKGROUND

Deployable vehicle steps typically include four-bar linkages for moving between an inboard stored position and an outboard deployed position. In this regard, the step typically includes a stepping surface that remains in substantially the same orientation, e.g. generally parallel to the ground, in both the deployed and stored positions. These deployable vehicle steps typically are stored sufficiently inboard that the step generally is not visible to an individual standing adjacent to the vehicle.

One known deployable step includes a four-bar linkage assembly that is configured for pivoting the step, yet by only a substantially small angle. Specifically, the four-bar linkage includes a first bracket and a second bracket pivotally attached to the first bracket by a pair of links, with one link sized longer than the other link. In this regard, the step includes a stepping surface that is generally parallel to the ground in the outboard deployed position and somewhat angled therefrom in the stored inboard position. Vehicles having this step include adjacent body-side structure that extends generally perpendicularly from the step.

It would therefore be desirable to provide a deployable step and body-side assembly that pivots by a substantially large degree for providing a horizontal stepping surface in a deployed position and a generally vertical body-side structure in a stored position.

SUMMARY OF THE INVENTION

A deployable step and body-side assembly ("assembly") for a vehicle is provided. The assembly includes a step body-side structure, one or more link assemblies, and an actuator. The step body-side structure is attached to the vehicle by the link assemblies. Each link assembly includes a carrier, an extending arm, a first link, a second link, a first rotating arm, and a second rotating arm. The carrier is attached to the step body-side structure and pivotally attached to the extending arm. The extending arm is pivotally attached to the vehicle by the first link and the second link so as to move the step body-side structure in an inboard direction and an outboard direction. The first rotating arm and second rotating arm rotate the step body-side structure, with the carrier pivotally attached to the vehicle by first rotating arm. The second rotating arm is pivotally attached to the first rotating arm, as well as the extending arm, the first link, and/or the second link. The step body-side structure is moved between the stored and deployed positions by an actuator.

One advantage of the invention is that a deployable step and body-side assembly is provided that rotates by a substantially large angle for positioning a stepping surface generally parallel to the ground and a body-side structure generally parallel to adjacent vehicle body-side.

Another advantage of the invention is that a deployable step and body-side assembly is provided that facilitates ingress and egress of a vehicle.

Yet another advantage of the invention is that a deployable step and body-side assembly is provided that can enhance vehicle design as styling dictates.

Still another advantage of the invention is that a deployable step and body-side assembly is provided that includes one or more link assemblies configured for being concealed during operation of the step.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention.

DETAILED DESCRIPTION OF THE INVENTION

Figure 1:
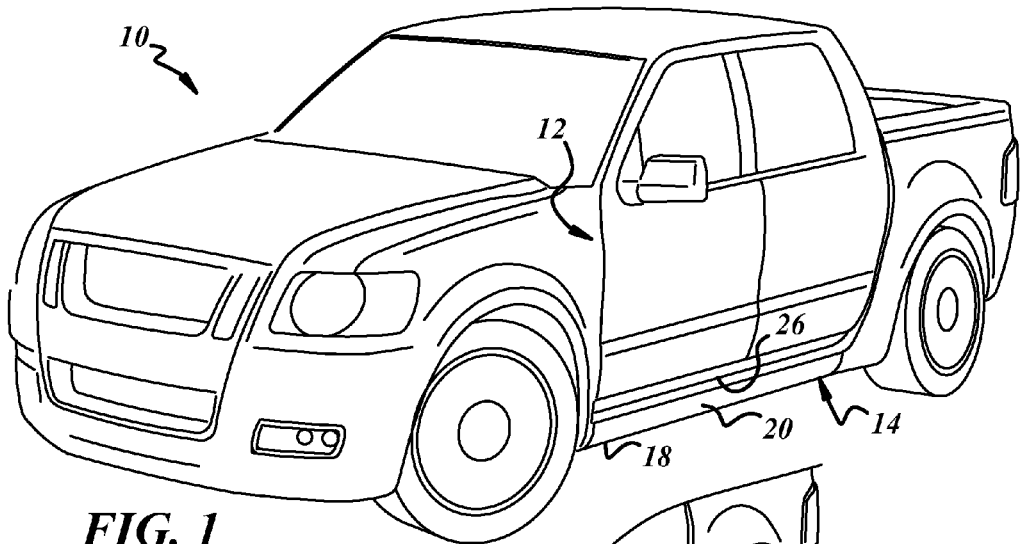
FIG. 1 is a front perspective view of a vehicle having a body-side with a deployable step and body-side assembly ("assembly") in a stored position, according to one embodiment of the invention.

In the following figures, the same reference numerals are used to identify the same components in the various views.

Figure 2:
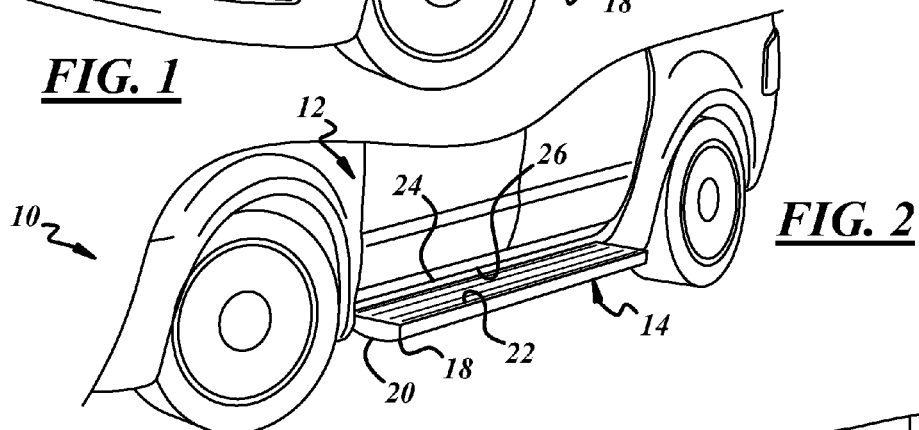
FIG. 2 is a cutaway perspective view of the vehicle shown in FIG. 1, illustrating the assembly in a deployed position.

Referring to FIGS. 1 and 2, there is shown a vehicle 10 having a body-side 12 with a deployable step and body-side assembly 14 ("assembly"), according to one embodiment of the invention. FIGS. 1 and 2 respectively illustrate the assembly 14 in stored and deployed positions. It is contemplated that assembly 14 can be integrated within a variety of suitable structures of the vehicle 10. For instance, in the embodiment illustrated in FIGS. 3 and 4, there is shown a vehicle 10 having a rear end structure 16 with an assembly 14' respectively in the stored and deployed positions.

As detailed below and exemplified in FIGS. 5 and 6, assembly 14 includes a step body-side structure 18 that pivots by a substantially large angle α. In this embodiment, this feature is beneficial for providing a substantially vertical molding 20 in the stored position (shown in FIG. 5) and a substantially horizontal stepping surface 22 in the deployed position (shown in FIG. 6). Also, in the stored position, the molding 20 covers a rocker 24 for the vehicle 10 adjacent to assembly 14. Molding 20 is substantially aligned with adjacent body-side structure 26 and has the same color. However, it is understood that molding 20 can be otherwise positioned relative to adjacent body-side structure 26 and have various suitable colors as styling dictates.

Figure 3:
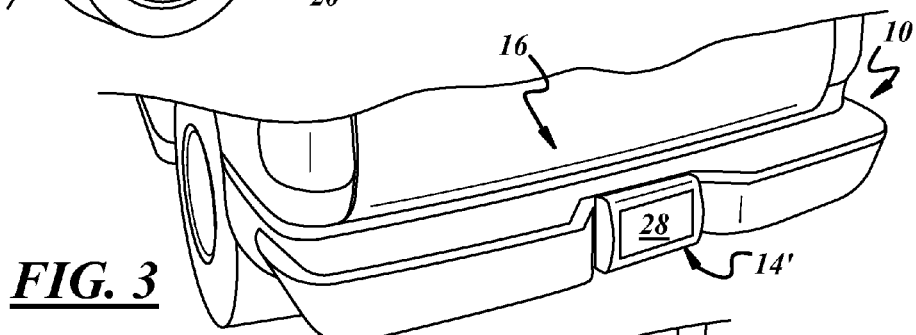
FIG. 3 is a cutaway perspective view of a vehicle having a rear end structure with a deployable step and body-side assembly in a stored position, according to an alternative embodiment of the invention.
Figure 4:
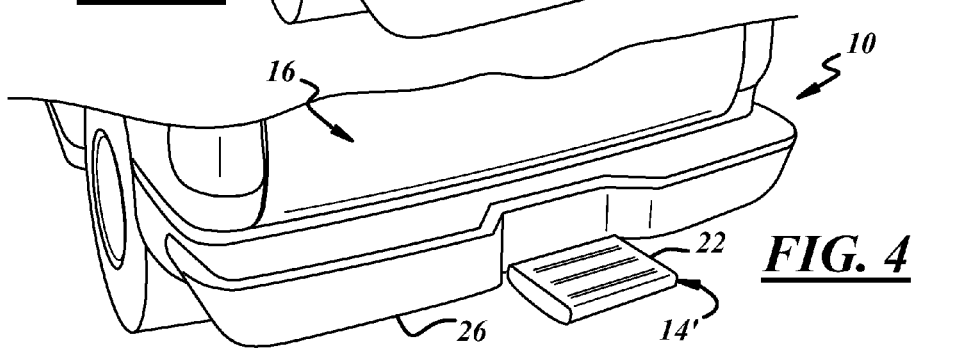
FIG. 4 is a cutaway perspective view of the vehicle shown in FIG. 3, illustrating the assembly in a deployed position.

With respect to the embodiment shown in FIGS. 3 and 4, the significant amount of rotational movement is beneficial for providing a generally vertical license plate 28 in the stored position and the generally horizontal stepping surface 22 in the deployed position. It is understood that conventional deployable steps do not sufficiently rotate for providing a generally horizontal stepping surface 22 and generally vertical body-side structures.

Referring back to FIGS. 5 and 6, each assembly 14 includes step body-side structure 18, along with one or more link assemblies 30, mounting brackets 32, and actuators 34.

Step body-side structure 18 is pivotally attached to the vehicle 10 by one or more link assemblies 30 and mounting brackets 32. For instance, three mounting brackets 32 and three link assemblies 30 can extend along the longitudinal step body-side structure 18 and pivotally attach the same to the vehicle 10. In particular, each mounting bracket 32 is attached to a rail 36 or other suitable portion of a vehicle frame 38. The link assemblies 30 pivot the step body-side structure 18 by about 60 degrees. However, it is contemplated that the link assemblies 30 can instead pivot the step body-side structure 18 by more or less than 60 degrees as desired. The actuator 34 is an electric linear motor in a sealed housing that protects the motor from debris that can hamper the function of the motor. It will be appreciated that the actuator 34 can be a variety of suitable mechanisms.

Figure 7:
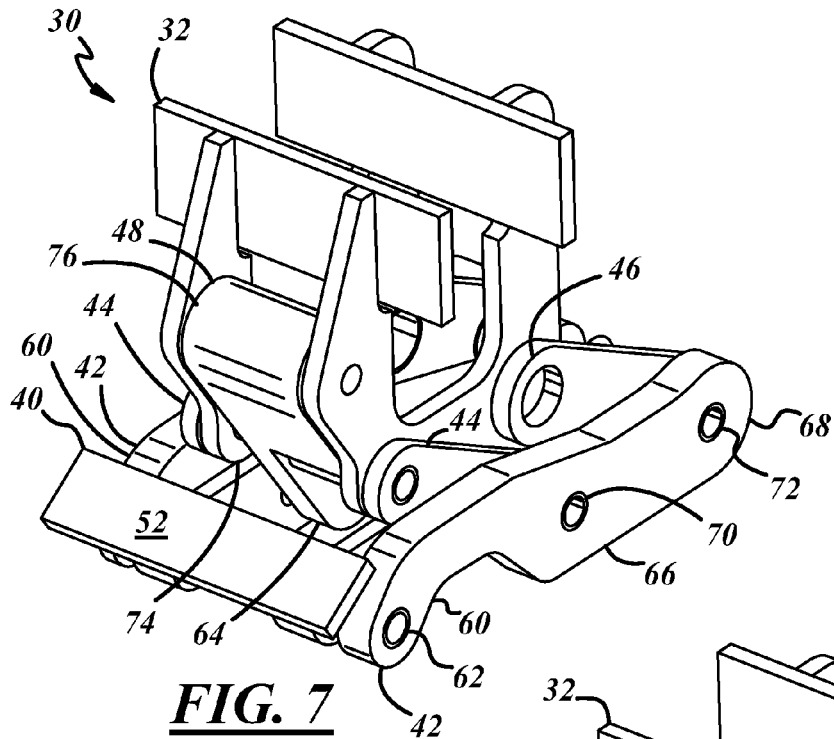
FIG. 7 is an outboard perspective view of the link assembly shown in FIG. 5.
Figure 8:
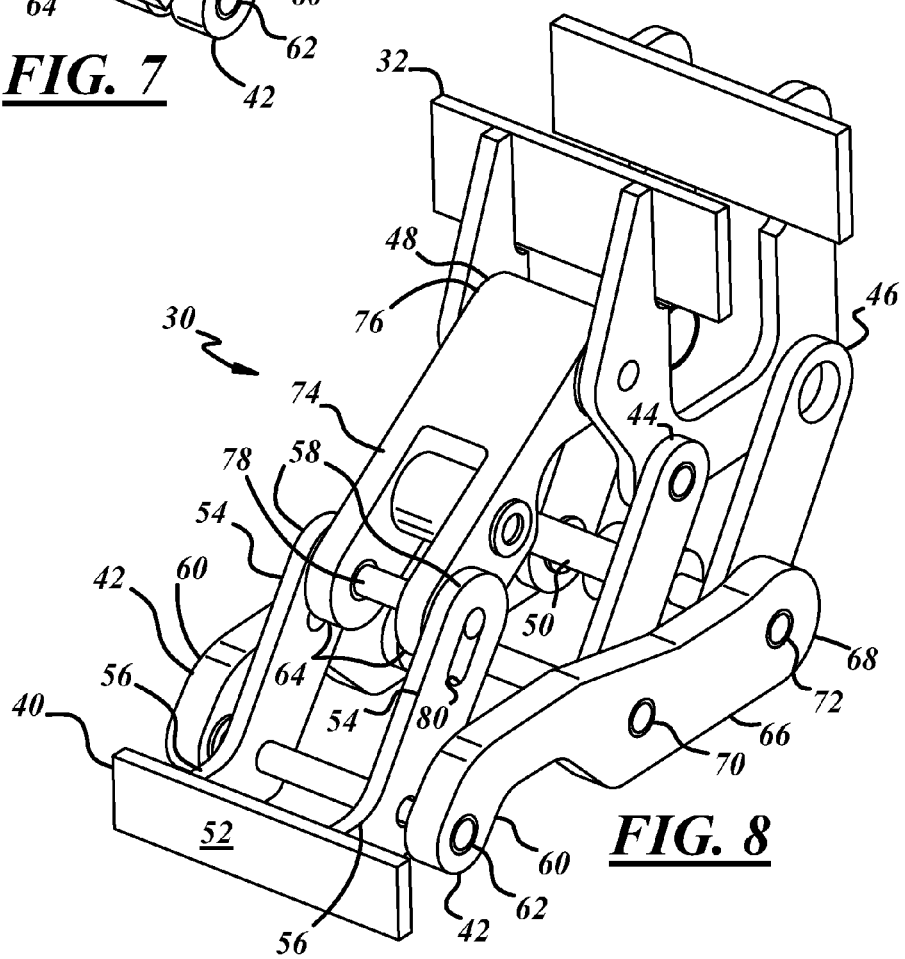
FIG. 8 is an outboard perspective view of the link assembly shown in FIG. 6.

As best shown in FIGS. 7 and 8, each link assembly 30 includes a carrier 40, a pair of extending arms 42, a first pair of links 44, a second pair of links 46, a first rotating arm 48, a second rotating arm 50, and mounting bracket 32.

Carrier 40 is formed from a plate 52 and two bars 54. Plate 52 is attached to step body-side structure 18 (as best shown in FIGS. 5 and 6). Each bar 54 has a first end portion 56 and a second end portion 58. First end portion 56 of each bar 54 is pivotally attached to an outboard portion 60 of extending arm 42 by an outboard axle 62. As detailed below, second end portion 58 of each bar 54 is pivotally attached to an outer end portion 64 of first rotating arm 48.

Each extending arm 42 is pivotally attached to mounting bracket 32 by the first pair of links 44 and the second pair of links 46. In particular, each extending arm 42 includes an intermediate portion 66 and an inboard portion 68. The intermediate portion 66 of extending arm 42 is pivotally attached to first pair of links 44 by an intermediate axle 70. The inboard portion 68 of each extending arm 42 is pivotally attached to second pair of links 46 by an inboard axle 72.

Also in this embodiment, second pair of links 46 and extensions arms 42 are pivotally attached to second rotating arm 50 by inboard axle 72, in order to rotate the step body-side structure 18. It is contemplated that first pair links 44, second pair of links 46, extending arms 42, or any suitable combination thereof can be attached to second rotating arm 50 for rotating step body-side structure 18. Second rotating arm 50 is pivotally attached to a center portion 74 of first rotating arm 48. This center portion 74 is between the outer end portion 64 and an inner end portion 76 of first rotating arm 48. Inner end portion 76 of first rotating arm 48 is pivotally attached to mounting bracket 32. In addition, as stated above, the outer end portion 64 of first rotating arm 48 is pivotally attached to second end portion 58 of carrier 40. Specifically, outer end portion 64 has a pin 78 sliding and pivoting in a slot 80 formed in second end portion 58 of carrier 40. In this respect, first rotating arm 48 and second rotating arm 50 cooperate to rotate step body-side structure 18 outboard by a substantially large degree to the deployed position. Also, first rotating arm 48 and second rotating arm 50 cooperate to prevent step body-side structure 18 from moving further outboard beyond the deployed position. It is understood that slot 80 can be sized, shaped, and otherwise configured for pivoting and/or otherwise moving the step body-side structure 18 in various ways.

Figure 5:
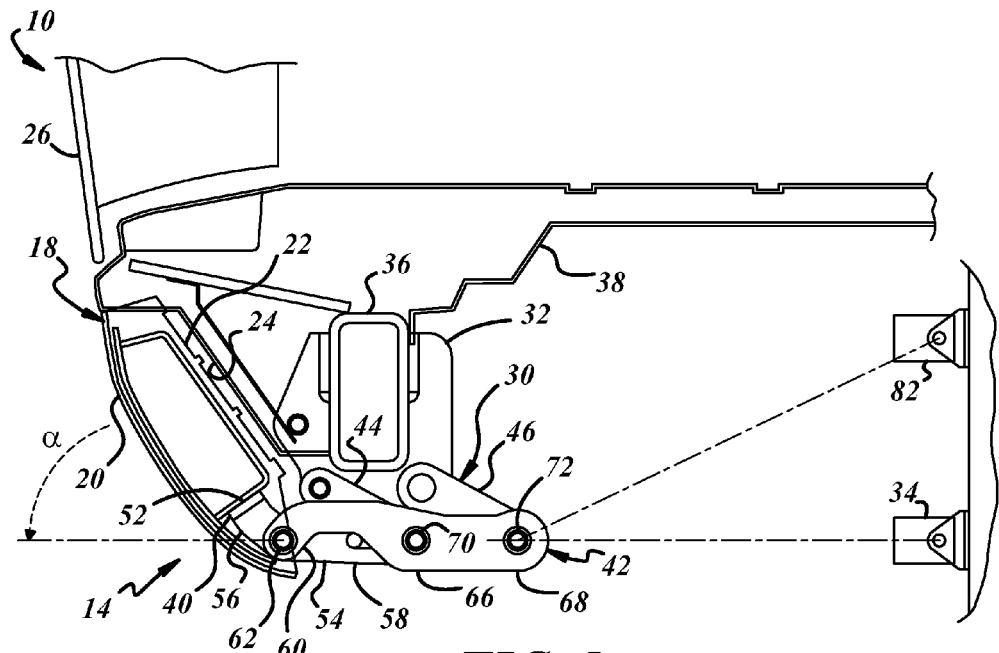
FIG. 5 is a cross-sectional view of the assembly shown in FIG. 1, as taken along line 5-5.
Figure 6:
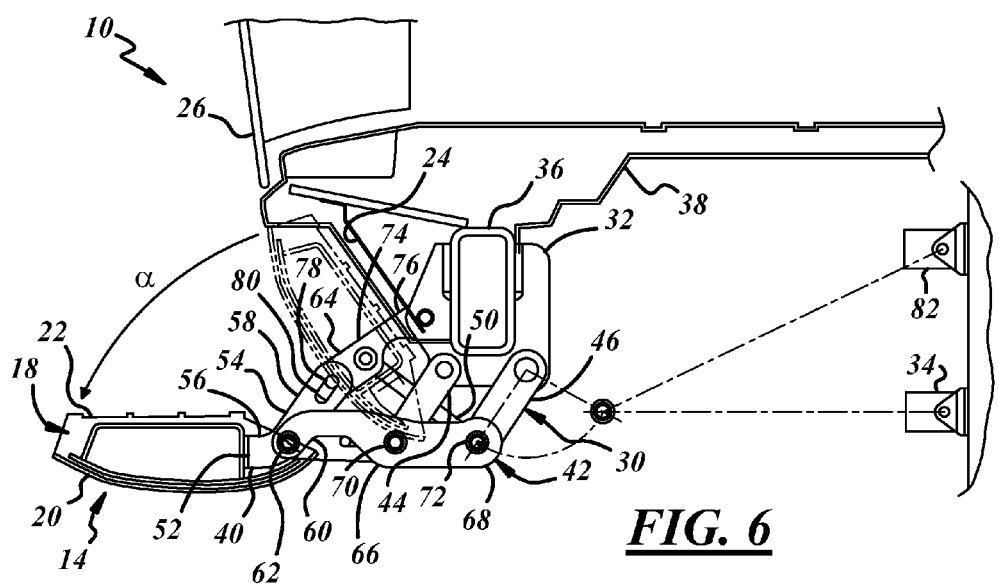
FIG. 6 is a cross-sectional view of the assembly shown in FIG. 2, as taken along line 6-6.

In the embodiment illustrated in FIGS. 5 and 6, the assembly 14 further includes one or more gas springs 82, which assist the actuator 34 in moving step body-side structure 18 between stored and deployed positions. Gas springs 82 and actuator 34 are mounted to vehicle frame 38 and are attached to link assembly 30. However, it is understood that gas springs 82 and actuator 34 can be otherwise integrated into the assembly 14 as desired.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A deployable step and body-side assembly for a vehicle, comprising:
   a step body-side structure;
   at least one link assembly attaching said step body-side structure to said vehicle; and
   an actuator moving said step body-side structure between a stored position and a deployed position;
   said at least one link assembly including a carrier, an extending arm, a first link, a second link, a first rotating arm extending between said carrier and said vehicle, and a second rotating arm extending directly between said first rotating arm and at least one of said first link, said second link, and said extending arm;
   said carrier attached to said step body-side structure;
   said extending arm pivotally attached to said carrier and adapted to move said step body-side structure in an inboard direction and an outboard direction;
   said extending arm pivotally attached to said vehicle by said first link and said second link;
   said first rotating arm and said second rotating arm cooperating to rotate said step body-side structure.

2. The deployable step and body-side assembly recited in claim 1 wherein said carrier has a first end portion and a second end portion, with said first end portion pivotally attached to said extending arm.

3. The deployable step and body-side assembly recited in claim 2 wherein said second end portion of said carrier is slidably attached to said first rotating arm.

4. The deployable step and body-side assembly recited in claim 3 wherein second end portion of said carrier has a slot with said first rotating arm having a pin moving within said slot.

5. The deployable step and body-side assembly recited in claim 1 wherein said extending arm has an outboard portion, an inboard portion, and an intermediate portion, with said outboard portion pivotally attached to said carrier.

6. The deployable step and body-side assembly recited in claim 5 wherein said inboard portion of said extending arm is pivotally attached to said second link.

7. The deployable step and body-side assembly recited in claim 5 wherein said intermediate portion of said extending arm is pivotally attached to said first link.

8. A vehicle comprising:
   a body side; and
   said deployable step and body-side assembly recited in claim 1;
   said deployable step and body-side assembly in said stored position including a molding for said body side.

9. The vehicle recited in claim 8 further comprising:
a rocker adjacent to said deployable step and body-side assembly recited in claim 1;
said molding being a rocker panel covering said rocker.

10. A deployable step and body-side assembly for a vehicle, comprising:
a step body-side structure;
at least one link assembly attaching said step body-side structure to said vehicle; and
an actuator moving said step body-side structure between a stored position and a deployed position;
said at least one link assembly including a carrier, a pair of extending arms, a first pair of links, a second pair of links, a mounting bracket, a first rotating arm extending between said carrier and said mounting bracket, and a second rotating arm extending directly between said first rotating arm and at least one of said first link, said second link, and said extending arm;
said carrier attached to said step body-side structure;
said pair of extending arms pivotally attached to said carrier and adapted to move said step body-side structure in an inboard direction and an outboard direction;
said pair of extending arms pivotally attached to said mounting bracket by said first pair of links and said second pair of links;
said mounting bracket attached to said vehicle;
said first rotating arm and said second rotating arm cooperating to rotate said step body-side structure.

11. The deployable step and body-side assembly recited in claim 10 wherein said carrier has a pair of bars with a first end portion and a second end portion, with said first end portion pivotally attached to said pair of extending arms.

12. The deployable step and body-side assembly recited in claim 11 wherein said second end portion of said carrier is slidably attached to said first rotating arm.

13. The deployable step and body-side assembly recited in claim 12 wherein second end portion of said carrier has a slot with a pin sliding therein and pivotally attached to said first rotating arm.

14. The deployable step and body-side assembly recited in claim 10 wherein said pair of extending arms has an outboard portion, an inboard portion, and an intermediate portion, with said outboard portion pivotally attached to said carrier by an outboard axle.

15. The deployable step and body-side assembly recited in claim 14 wherein said second end portion of said extending arms are pivotally attached to said second pair of links by an inboard axle.

16. The deployable step and body-side assembly recited in claim 15 wherein said second rotating arm is pivotally attached to and extends between said inboard axle and said first rotating arm.

17. The deployable step and body-side assembly recited in claim 14 wherein said intermediate portion of said pair of extending arms are pivotally attached to said pair of first links by an intermediate axle.

18. A deployable step and body-side assembly for a vehicle, comprising:
a step body-side structure;
at least one link assembly attaching said step body-side structure to said vehicle; and
an actuator moving said step body-side structure between a stored position and a deployed position;
said at least one link assembly including a carrier, an extending arm, a first link, a second link, a first rotating arm extending between said carrier and said vehicle, and a second rotating arm extending directly between said first rotating arm and at least one of said first link, said second link, and said extending arm;
said carrier attached to said step body-side structure;
said extending arm pivotally attached to said carrier and adapted to move said step body-side structure in an inboard direction and an outboard direction;
said extending arm pivotally attached to said vehicle by said first link and said second link;
said first rotating arm and said second rotating arm cooperating to rotate said step body-side structure;
said first rotating arm and said second rotating arm cooperating to lock said step body-side structure in said deployed position and preventing said step body-side structure from rotating outboard beyond said deployed position.

* * * * *